United States Patent
Shi

(10) Patent No.: US 7,881,299 B2
(45) Date of Patent: Feb. 1, 2011

(54) METHOD AND APPARATUS FOR MANAGING AND TRANSMITTING FINE GRANULARITY SERVICES

(75) Inventor: Xinghua Shi, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 973 days.

(21) Appl. No.: 11/730,679

(22) Filed: Apr. 3, 2007

(65) Prior Publication Data
US 2008/0037985 A1  Feb. 14, 2008

(30) Foreign Application Priority Data
Aug. 14, 2006  (CN) .................. 2006 1 0109594

(51) Int. Cl.
H04L 12/28  (2006.01)
H04L 12/56  (2006.01)
(52) U.S. Cl. .................. 370/392; 370/397; 370/409
(58) Field of Classification Search .................. None
See application file for complete search history.

(56) References Cited

U.S. PATENT DOCUMENTS

| | | | | |
|---|---|---|---|---|
| 6,385,170 | B1* | 5/2002 | Chiu et al. .................. | 370/235 |
| 7,602,726 | B1* | 10/2009 | Sundaresan et al. ......... | 370/237 |
| 2002/0181457 | A1* | 12/2002 | Mezeul et al. .............. | 370/389 |
| 2003/0193901 | A1* | 10/2003 | Ishibashi .................. | 370/252 |
| 2004/0153492 | A1* | 8/2004 | Cao et al. .................. | 709/200 |
| 2005/0030951 | A1* | 2/2005 | Maciocco et al. ......... | 370/395.2 |
| 2005/0053325 | A1* | 3/2005 | Chandrasekhar et al. ...... | 385/24 |
| 2005/0105905 | A1* | 5/2005 | Ovadia et al. .................. | 398/47 |
| 2005/0135405 | A1* | 6/2005 | Galand et al. ................ | 370/442 |
| 2006/0146696 | A1* | 7/2006 | Li et al. ....................... | 370/218 |
| 2007/0242667 | A1* | 10/2007 | Liu ............................ | 370/389 |
| 2008/0291924 | A1* | 11/2008 | Ishii .......................... | 370/400 |

FOREIGN PATENT DOCUMENTS

CN           1540938 A      10/2004

(Continued)

OTHER PUBLICATIONS

W. Jia, S. Yu, J. Zhang, W. Yang, Y. Xu, Y. Zhang, W. Gu, "A Testbed for Multi-Granularity Optical Switching Network", Optical Society of America, 2005, entire document.*

(Continued)

Primary Examiner—Chirag G Shah
Assistant Examiner—Suk Jin Kang
(74) Attorney, Agent, or Firm—Conley Rose, P.C.; Grant Rodolph

(57) ABSTRACT

Embodiments of the present invention provide a method and an apparatus for managing and transmitting fine granularity services. The method includes: increasing the bandwidth of an existing LSP which controls a fine granularity service with the same granularity as that of a new fine granularity service to be established, upon determining that the new fine granularity service shares the same source node and destination node with the existing LSP; and transmitting the new fine granularity service with the increased bandwidth of the existing LSP. The bandwidth utilization rate of optical networks can be obviously increased when transmitting fine granularity services in accordance with the embodiments of the present invention; furthermore, the storage space of each node through which the LSP passes is saved and the recovery performance of fine granularity services is guaranteed.

15 Claims, 4 Drawing Sheets

FOREIGN PATENT DOCUMENTS

| EP | 1 679 842 | 7/2006 |
|---|---|---|
| WO | WO 02/17580 | 2/2002 |
| WO | WO 2005/081474 | 9/2005 |

OTHER PUBLICATIONS

S. Huang, K. Baba, M. Murata, K. Kitayama, "Fine Multi-granularity Optical Path by Novel OCDM-based Switch Architecture", The 5th International Conference on Optical Internet (COIN), Jul. 2006., entire document.*

N. Jerram, A. Farrel, "MPLS in Optical Networks", Data Connections Ltd., Version 2, Oct. 2001, pp. 11-15.*

Rosen Cisco Systems et al.; "Multiprotocol Label Switching Architecture", IETF Standard, Internet Engineering Task Force, IETF, Ch, Jan. 2001 XP015008814 relevant to claims 7, 8, 14; 1-6, 9-13, 15, 16.

Bernstein Grotto Networking E Mannie Perceval V Sharma Metanoia G et al.; "Framework for Generalized Multi-Protocol Label Switching (GMPLS)-based Control of Synchronous Digital Hierarchy/Synchronous Optical Networking (SDH/SONET) Networks"; IETF Standard, Internet Engineering Task Force, IETF, CH, Dec. 2005 XP 015043195 relevant to claim 12; claims 1-11, 13-16.

Chinese Office Action, Application No. 2006101095945, 10 pages.

* cited by examiner

METHOD AND APPARATUS FOR MANAGING AND TRANSMITTING FINE GRANULARITY SERVICES

CROSS-REFERENCE TO RELATED APPLICATIONS

This application claims priority of Chinese Patent Application No. 200610109594.5, filed Aug. 14, 2006, the disclosure of which is hereby incorporated by reference in its entirety.

FIELD OF THE INVENTION

The present invention relates to optical communication technologies, and particularly, to a method and an apparatus for managing and transmitting fine granularity services.

BACKGROUND OF THE INVENTION

An Automatically Switched Optical Network (ASON) is a type of dynamically and automatically switched transport network. It is a new generation of optical networks, wherein a service request is initiated dynamically by users; a path is calculated and selected automatically by a network element; and the setup, restoration, clearance of a connection are controlled by signaling; moreover switching and transporting are integrated.

An ASON includes two layers: a control plane and a transport plane. The function of the control plane includes collecting and distributing the network topology of the ASON to form a "network map" representing the accurate network topology, calculating a viable path with some routing algorithms by use of the "network map", and establishing an intelligent circuit by driving each node on the path through signaling protocols. The function of the transport plane is to set up or delete cross-connections on each network element, and establish or withdraw services on the transport plane according to instructions from the control plane.

Conventionally, the ASON is mainly applied to a backbone network, in which the services are carried by higher order Virtual Containers (VC), i.e., VC4, and the majority of optical communication equipment manufacturers currently only support intelligent services with VC4 granularity. Along with the popularization and development of ASON, it gradually expands to the Metropolitan Area Network where applications of services with VC12 granularity are growing, therefore, establishing a Label Switched Path (LSP) with VC12 granularity, i.e., a VC12 LSP, becomes an important demand in ASON. RFC 3946 (GMPLS Extensions for SONET/SDH Control) defines a label format for the VC12 LSP. However, as the bandwidth of one VC4 is enough for 63 VC12 LSPs, the number of VC12 LSPs grows so huge that varieties of problems concerning performance emerge, which are unacceptable by equipment manufacturers and network operators. For example, provided there are 48 services with VC4 bandwidth over an optical fiber and each VC4 contains 63 VC12 LSPs, when the optical fiber is interrupted, there will be 48*63 LSPs initiating re-routing processes, which takes long time to recover and thus leads to poor recovery performance; furthermore, in a node with 40 Gbps lower order cross-connection capability, 4*64*63/2=8064 VC12 LSPs may be established, which will occupy a large storage space of the node and lead to the shortage of the storage space.

The above problems may be solved by establishing an end-to-end tunnel or a segment tunnel. However, in the case that an end-to-end tunnel is established, a dedicated VC4 tunnel will be occupied even there is only one VC12 service or just a few VC12 services transmitted through the tunnel, which results in a very low bandwidth utilization rate. In the case that a segment tunnel is established, i.e., VC4 tunnels are established in advance between every two nodes and VC12 services are loaded on these tunnel segments, as every node is the source node and the destination node of an LSP tunnel, when there is a failure in one of the nodes or the optical fibers on both sides of a node are interrupted at the same time, the tunnel LSP cannot perform a re-routing process, hence the VC12 services cannot be effectively protected. In view of the above problems, a perfect VC12 service solution is not put forward by the industry yet.

SUMMARY OF THE INVENTION

Embodiments of the present invention provide a method and an apparatus for transmitting fine granularity services, so as to improve the network bandwidth utilization rate and guarantee the recovery performance of fine granularity services.

A method for managing and transmitting fine granularity services includes:

increasing the bandwidth of an existing LSP which controls a fine granularity service with the same granularity as that of a new fine granularity service to be established, upon determining that the new fine granularity service shares the same source node and destination node with the existing LSP; and transmitting the new fine granularity service with the increased bandwidth of the existing LSP.

The process of determining that the new fine granularity service shares the same source node and destination node with the existing LSP includes:

reading the addresses of the source node and the destination node of the new fine granularity service from a request for establishing the new fine granularity service; and determining whether the source node and the destination node of the new service are identical with the source node and the destination node of the existing LSP according to the addresses of the source node and the destination node read from the request.

The process of increasing the bandwidth of the existing LSP includes:

sending an LSP bandwidth update message, which contains a time slot to be occupied by the new fine granularity service, to all nodes along the existing LSP; and setting up, by each node along the existing LSP, a lower order cross-connection corresponding to the new fine granularity service according to the time slot contained in the LSP bandwidth update message.

The method further includes:

before increasing the bandwidth of the existing LSP, determining, according to lower order cross-connection capability of each node across the whole network, whether the new fine granularity service can be established along the existing LSP;

increasing the bandwidth of the existing LSP if the new fine granularity service can be established; and calculating another route and establishing a new LSP for controlling the new fine granularity service if the new fine granularity service can not be established.

The method further includes:

calculating another route and establishing a new LSP for controlling the new fine granularity service upon determining that the source node and the destination node of the new fine granularity service to be established are not identical with the source node and the destination node of the existing LSP.

When the fine granularity services controlled by the existing LSP contain a fine granularity service to be deleted, the method further includes:

deleting the existing LSP if the fine granularity service to be deleted is the last fine granularity service of the existing LSP;

sending an LSP bandwidth update message, which contains a time slot occupied by the fine granularity service to be deleted, to all the nodes along the existing LSP, and deleting, by each node on the existing LSP, a lower order cross-connection corresponding to the time slot contained in the LSP bandwidth update message, if the fine granularity service to be deleted is not the last fine granularity service of the existing LSP.

The method further includes:

integrating the fine granularity services controlled by the existing LSP into a coarse granularity service when the number of the fine granularity services controlled by the existing LSP exceeds a preset value; and integrating all lower order cross-connections corresponding to the existing LSP into a higher order cross-connection in all intermediate nodes except the source node and the destination node along the existing LSP.

The process of integrating includes:

sending a signaling message along the existing LSP to integrate fine granularity services, wherein the signaling message contains an indication for notifying the intermediate nodes on the existing LSP to establish a higher order cross-connection instead of a lower order cross-connection; and integrating, by each intermediate node along the existing LSP, the lower order cross-connection corresponding to the fine granularity service controlled by the existing LSP into a higher order cross-connection upon the receipt of the signaling message.

When the existing LSP is interrupted due to a node failure or a communication link failure on the existing LSP, the method further includes:

establishing at least one new LSP through a re-routing process to control the fine granularity services controlled by the existing LSP interrupted.

The process of establishing at least one new LSP includes:

determining, by the node which has initiated the re-routing process, according to lower order cross-connection capability information of each node across the whole network, whether it is necessary to divide the fine granularity services to be re-routed into at least two fine granularity service groups and re-route the at least two fine granularity service groups respectively, re-routing all fine granularity services together if it is not necessary to divide the fine granularity services to be re-routed into at least two fine granularity service groups; and re-routing each fine granularity service group respectively if it is necessary to divide the fine granularity services to be re-routed into at least two fine granularity service groups.

The process of re-routing includes:

calculating a new LSP through a route algorithm, re-routing, along the new LSP all the fine granularity services controlled by the existing LSP interrupted, and issuing the lower order cross-connection to each node along the new LSP, if it is not necessary to divide the fine granularity services to be re-routed into at least two fine granularity service groups;

calculating, through the route algorithm, at least two new LSPs each of which controls a certain number of fine granularity services, re-routing the certain number of fine granularity services controlled by each of the new LSPs, and issuing the lower order cross-connection to each node along each of the new LSPs, if it is necessary to divide the fine granularity services to be re-routed into the at least two fine granularity service groups.

The fine granularity service is one of a VC11 service, a VC12 service, a VC2 service and a VC3 service, and the coarse granularity service is a VC4 service.

An apparatus for transmitting fine granularity services includes:

means for increasing the bandwidth of an existing LSP which controls a fine granularity service with the same granularity as that of a new fine granularity service to be established, upon determining that the new fine granularity service shares the same source node and destination node with the existing LSP; and means for transmitting the new fine granularity service with the increased bandwidth of the existing LSP.

The apparatus further includes:

means for integrating fine granularity services controlled by the existing LSP into a coarse granularity service; and means for integrating all lower order cross-connections corresponding to the fine granularity services into a higher order cross-connection.

The apparatus further includes:

means for deleting the lower order cross-connection corresponding to a fine granularity service to be deleted.

The apparatus further includes:

means for deleting the existing LSP upon determining that the fine granularity service to be deleted is the last fine granularity service of the existing LSP.

In accordance with embodiments of the present invention for managing and transmitting fine granularity services, one LSP is established for a group of fine granularity services with the same source node and destination node, and the group of fine granularity services controlled by the LSP shares a same path. When the LSP is interrupted, all the fine granularity services on the LSP shall be re-routed to one or more LSPs to ensure the continuity of the services. It can be concluded from the fore-going description that the method in accordance with embodiments of the present invention offers a much higher bandwidth utilization rate than the method in the prior art does when transmitting the fine granularity service over an optical network, and saves the storage spaces of nodes in the communication network and improves service recovery performance. Therefore, it can be guaranteed that the communication network transmits services for users smoothly and effectively, thus the user satisfaction can be distinctively increased.

DETAILED DESCRIPTION OF THE INVENTION

A detailed description of the present invention is provided hereinafter with reference to attached drawings and specific embodiments.

In order to solve the problem in the prior art, a first embodiment of the present invention provides a method for managing and transmitting VC12 services, including:

1) establishing one LSP for a group of VC12 services (less than or equal to 63 services) with the same source node and destination node, and transmitting the VC12 services through the same path;

2) establishing an LSP for controlling the first VC12 service to be established, updating the bandwidth of the LSP when a VC12 service is established or deleted, and deleting the LSP when the last VC12 service controlled by the LSP is deleted;

3) re-routing all the VC12 services controlled by the LSP at the same time (or in batches) to another path (or paths) upon there is a failure on the path, e.g., a optical fiber broken;

4) integrating VC12 services into a VC4 tunnel through resource integration when the number of VC12 services of same group controlled by same LSP reaches a predetermined value (e.g., 48), so as to save the VC12 lower order cross-connection resources of intermediate nodes;

5) establishing an intelligent VC4 tunnel directly to carry VC12 services when there are large numbers of VC12 services with the same source node and destination node to be established at the same time.

According to the foregoing description, in the method provided by the first embodiment for managing and transmitting VC12 services, an LSP for controlling VC12 services shall be established through the process of establishing the LSP in the prior art when the first VC12 is established between a source node and a destination node. After that, when a new VC12 service needs to be added between the source node and the destination node, the bandwidth of the LSP shall be increased through a signaling message, e.g., a Path message and a Reserve message of the Resource ReSerVation Protocol (RSVP) and thus the new VC12 service shall be transmitted over the increased bandwidth. When a VC12 service established between the source node and the destination node needs to be deleted, the bandwidth of the LSP shall be decreased through the signaling message, e.g., the Path message and the Reserve message of the RSVP. In special cases, when the deleted VC12 service is the last VC12 service control by the LSP, the LSP shall be deleted through the method for deleting the LSP in the prior art.

Figure 1:
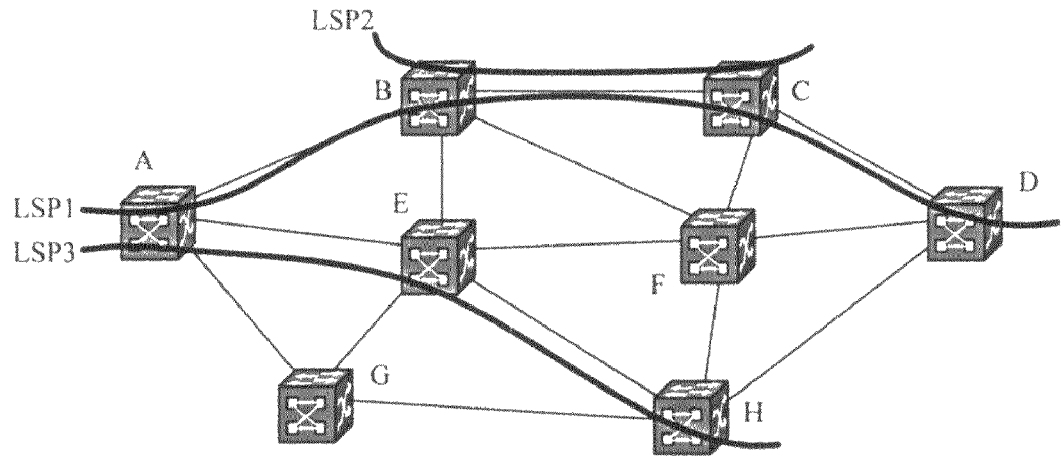
FIG. 1 is a schematic drawing illustrating the basic principle of VC12 service management and transmission in accordance with a first embodiment of the present invention.

FIG. 1 is a schematic drawing illustrating the network structure used for managing and transmitting VC12 services in accordance with the first embodiment. In FIG. 1, the thin lines between communication nodes indicate physical connections between the communication nodes, and the thick lines between the communication nodes indicate LSPs that control VC12 services. The thin lines and thick lines in FIGS. 4-7 have the same meaning as in FIG. 1.

As shown in FIG. 1, the demand for VC12 services in the communication system in FIG. 1 includes: 50 VC12 services between Node A and Node D, 12 VC12 services between Node B and Node C, and 40 VC12 services between Node A and Node H. According to the method provided in the embodiment, 3 LSPs, shown as LSP1, LSP2 and LSP3 in FIG. 1, shall be established to manage and control the VC12 services. LSP1 manages and controls the 50 VC12 services between Node A and Node D; LSP2 manages and controls the 12 VC12 services between Node B and Node C; and LSP3 manages and controls the 40 VC12 services between Node A and Node H.

The process of establishing and deleting the VC12 services in the method in accordance with the embodiment for managing and transmitting the VC12 services is explained in detail herein with reference to accompanying drawing.

Figure 2:
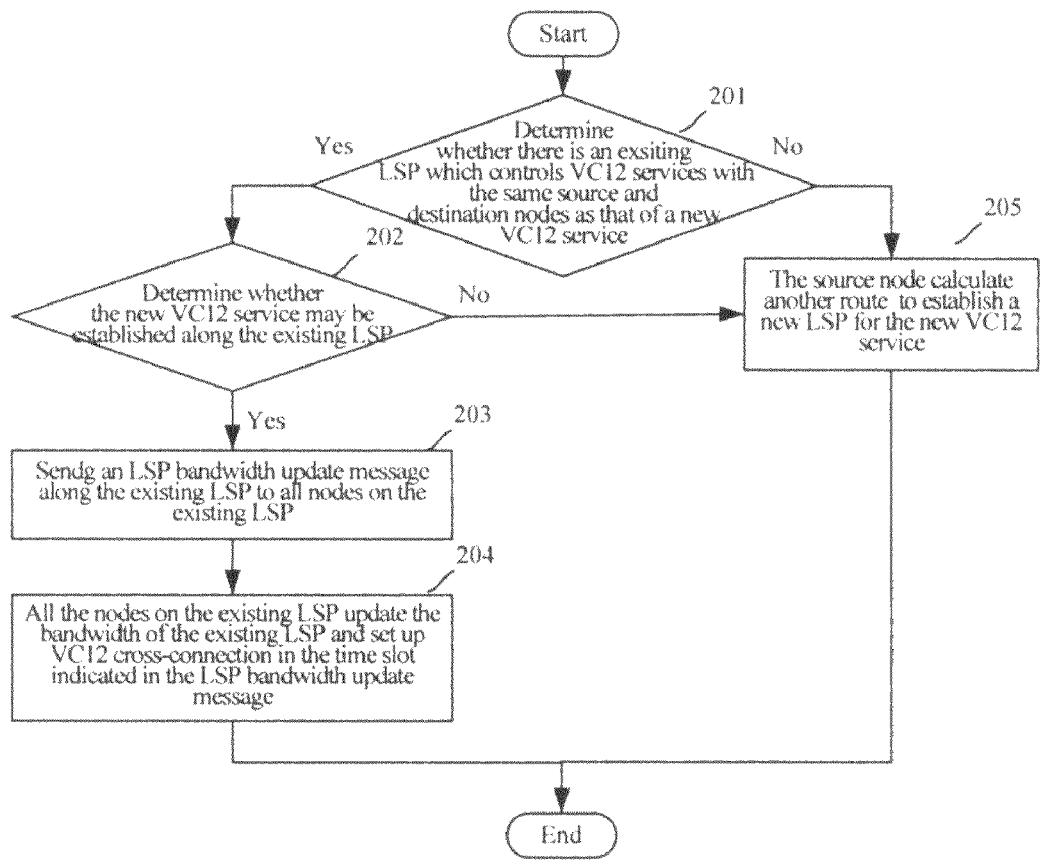
FIG. 2 is a flow chart of VC12 service establishment in accordance with the first embodiment of the present invention.

FIG. 2 shows the process of establishing a VC12 service in a communication network in accordance with the embodiment of the present invention, including the following process.

Step 201: the source node determines first whether there is an existing LSP which controls VC12 services with the same source node and destination node as those of a new VC12 service to be established when it is needed to establish the new VC12 service between the source node and the destination node, and performing Step 202 if there is the existing LSP, otherwise performing Step 205.

In Step 201, the source node reads the addresses of the source node and the destination node of the new VC12 service from a service request for establishing the new VC12 service, and determines, according to the addresses of the source node and the destination node, whether the source node and the destination node of the new VC12 service are identical with the source node and the destination node of the existing LSP with VC12 granularity.

Step 202: the source node further determines, according to the resource allocation condition of each node in the communication network, whether the new VC12 service can be established along the existing LSP, and performing Step 203 if the new VC12 service can be established along the existing LSP; otherwise performing Step 205.

In order to perform Step 202, i.e., to determine whether the new VC12 service can be established along the existing LSP, it is needed to distribute the available lower order cross-connection capability of each node across the whole network. Preferably, the lower order cross-connection capability is distributed through a routing protocol. When learning the lower order cross-connection capability of each node in the network, the source node, while establishing the new VC12 service, can determine exactly whether the new VC12 service can be established along the existing LSP or to establish the new VC 12 service by choosing a new path. To be specific, when all the nodes on the existing LSP can support the new VC12 service, the new VC12 service can be established along the existing LSP, otherwise a new path shall be chosen through a route algorithm to establish a new LSP and thus to establish the new VC12 service.

Step 203: the source node sends an LSP bandwidth update message, which contains a time slot to be occupied by the new VC12 service, along the existing LSP, to all nodes on the existing LSP.

The LSP bandwidth update message may be a Path message and a Reserve message, as described in the foregoing description.

It should be noted that time slots of the VC12 services controlled by an LSP may be continuous or discontinuous. When continuous time slots of the VC12 services controlled by the LSP are required, the LSP bandwidth update message may indicate the time slot occupied by each service with an initial time slot plus the bandwidth, so as to reduce the size of LSP bandwidth update message. However, in such case, VC12 services which share the same source node and destination node have to occupy an independent VC4 tunnel, which leads to lower bandwidth utilization rate. Preferably, while assigning a time slot to the new VC12 service, the source node may first choose the VC12 time slot on a VC4 tunnel on which some VC12 time slots have been already assigned, so as to raise the bandwidth utilization rate.

Step 204: each node on the existing LSP updates the bandwidth of the existing LSP upon the receipt of the LSP bandwidth update message, and establishes a VC12 cross-connection in the time slot indicated in the LSP bandwidth update message to establish the new VC12 service.

Step 205: the source node calculates another route to find an appropriate route on which all nodes are equipped with lower order cross-connection capability to support the new VC12 service, so that a new LSP with VC12 granularity may be established.

As described in Step 202, it is needed to distribute the available lower order cross-connection capability of each node across the whole network through a method such as expanded routing protocol. The source node can calculate a route for carrying a new VC12 service after having learnt the lower order cross-connection capability of each node across the whole network.

For example, as shown in FIG. 1, when a new VC12 service needs to be established between Node A and Node D, Node A determines that there is LSP1 which shares the same source node and destination node with the new VC12 service. Then Node A determines, according to the lower order across-connection capability of Node B and Node C, whether the new VC12 service can be transmitted along LSP1, and if the new VC12 service can be transmitted along LSP1, Node A sends an LSP bandwidth update message to Nodes B, C and D along the LSP1, instructing Nodes B, C and D to establish a VC12 cross-connection respectively to carry the new VC12 service. When the lower order cross-connection capability of Nodes B and C cannot support the new VC12 service, Node A calculates another route to obtain a new route, e.g., Node A-Node E-Node F-Node D, and establishes a new LSP along the new route to transmit the new VC12 service.

It should be noted that, though the above method for establishing the new VC12 service is described by taking an example of establishing one VC12 service, the method can also be adopted to establish two or more VC12 services between the source node and the destination node. In such cases, the difference in the process is that the LSP bandwidth update message shall indicate two or more time slots corresponding to the two or more VC12 services respectively, so that all the nodes on the LSP may, upon the receipt of the LSP bandwidth update message, establish two or more VC12 cross-connections according to the time slots indicated by the LSP bandwidth update message and thus establish two or more VC12 services.

It can be concluded from the foregoing description that, through the method in accordance with the embodiment of the present invention for establishing VC12 services, it is needed to establish one LSP for controlling multiple VC12 services which share the same source node and destination node. Compared with the method in the prior art, in which it is needed to establish one LSP for each VC12 service, the method in accordance with the embodiment of the present invention saves much more storage spaces for all the nodes; and compared with the method for transmitting VC12 services through a VC4 tunnel, the method in accordance with the embodiment of the present invention also greatly increases the bandwidth utilization rate of the communication network.

Figure 3:
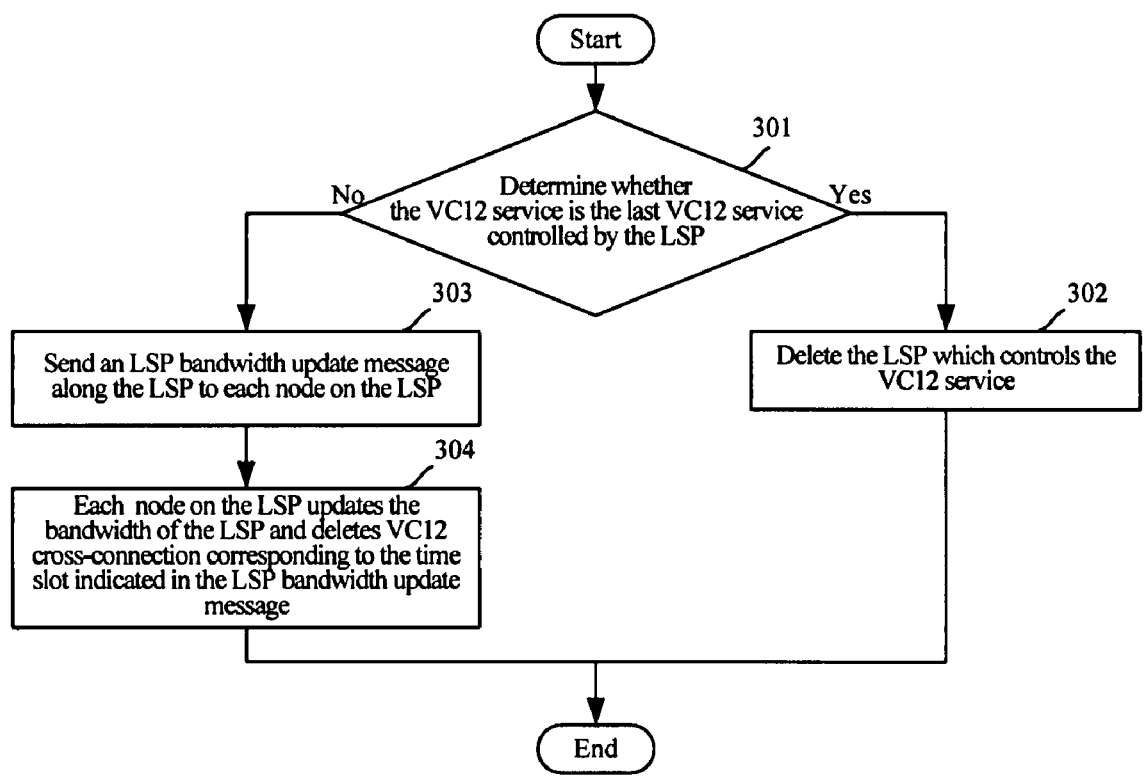
FIG. 3 is a flow chart of VC12 service deletion in accordance with the first embodiment of the present invention.

FIG. 3 shows the process of deleting a VC12 service in a communication network in accordance with the embodiment of the present invention, including the following process.

Step 301: a source node determines whether the VC12 service is the last VC12 service controlled by the LSP when a VC12 service shall be deleted between the source node and a destination node, and performing Step 302 if the VC12 service is the last VC12 service controlled by the LSP; otherwise performing Step 303.

In this step, the source node may determine whether the VC12 service to be deleted is the last VC12 service controlled by the LSP according to the bandwidth of the LSP. For example, if the bandwidth of the LSP is only enough for one VC12 service, the VC12 service to be deleted is the last VC12 service controlled by the LSP.

Step 302: deleting the LSP which controls the VC12 service.

The LSP can be deleted in this step according to an LSP deletion procedure in the prior art.

Step 303: the source node sends an LSP bandwidth update message which indicates the time slot occupied by the VC12 service to be deleted to each node along the LSP.

Step 304: each node on the LSP updates the bandwidth of the LSP upon the receipt of the LSP bandwidth update message, and deletes the VC12 cross-connection corresponding to the time slot indicated in the LSP bandwidth update message.

The foregoing method for establishing and deleting VC12 services is suitable to the cases in which VC12 services are increasing, i.e., the number of VC12 services in the network is small first but is increasing. When there have been many VC12 services between two nodes from the beginning of the network establishment, a VC4 tunnel can be established directly to transmit VC12 services between the source node and the destination node.

In the application mode in which VC12 services are increasing, when the number of VC12 services between the source node and the destination node exceeds a predetermined value, e.g., 48, the VC12 services may be further integrated, i.e., the VC12 cross-connections on intermediate nodes shall be integrated into a VC4 cross-connection to save the VC12 lower order cross-connection resources of the intermediate nodes. As described in the foregoing description, there are 62 VC12 services between Node B and Node C in FIG. 1, and the 62 VC12 services between Node B and Node C can be integrated, through a resource integration process, into one VC4 service transmitted through a VC4 tunnel. Therefore, when there are other intermediate nodes between Node B and Node C, the other intermediate nodes may establish one VC4 cross-connection directly to replace the existing 62 VC12 cross-connections so as to save the lower order cross-connection resources of the intermediate nodes to a great extent.

In accordance with a second embodiment of the present invention, the resource integration of VC12 services is implemented based on the method for managing and transmitting VC12 services as shown in the first embodiment of the present invention. In the second embodiment, the resource integration is implemented through service path optimization, i.e., integrating an LSP or multiple LSPs into a VC4 tunnel for optimization. In the practical application, an indication, which notifies the intermediate nodes to establish a VC4 cross-connection instead of a VC12 cross-connection, is contained in the signaling messages for optimization, such as a Path message in RSVP. In the process of resource integration, the source node and the destination node still keep lower order cross-connection due to the difference of their service access boards. Preferably, a Bridge-and-Roll technique can be adopted in the optimization process so as not to interrupt services. The lower order cross-connection resources on the intermediate nodes can be saved to a great extent through the process of resource integration.

Figure 4A:
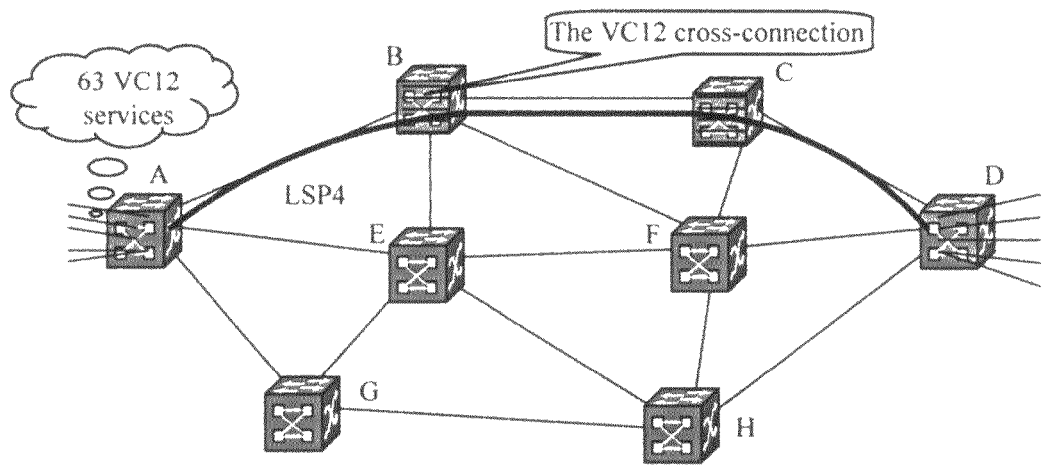
FIG. 4A is a schematic drawing illustrating the LSP before resource integration in accordance with a second embodiment of the present invention.
Figure 4B:
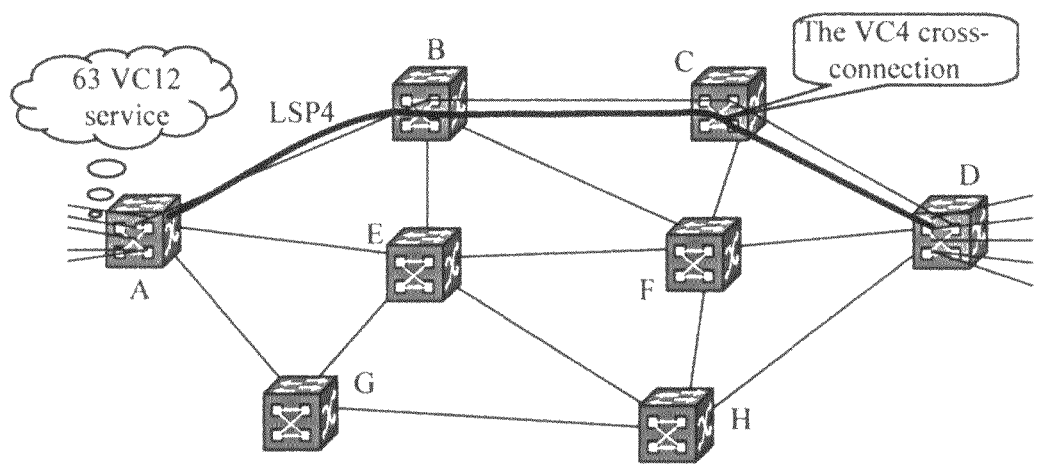
FIG. 4B is a schematic drawing illustrating the LSP after resource integration in accordance with the second embodiment of the present invention.

FIG. 4A illustrates the network structure before the process of resource integration in accordance with the second embodiment of the present invention. As shown in FIG. 4A, there are 63 VC12 services along the LSP between Node A and Node D, and the LSP passes through two intermediate nodes, Node B and Node C. Each of Nodes A, B, C and D establishes 63 VC12 cross-connections through the method described in the first embodiment to transmit the 63 VC12 services controlled by the LSP. FIG. 4B illustrates the network structure after integrating VC12 services through the process of resource integration in accordance with the second embodiment of the present invention. As shown in FIG. 4B, the 63 VC12 services controlled by the LSP are, through the process of resource integration, integrated into a VC4 service to be transmitted by a VC4 tunnel. Therefore the intermediate nodes between Node A and Node D, i.e., Node B and Node C, can establish a VC4 cross-connection respectively to replace the existing 63 VC12 cross-connections, which greatly saves the lower order cross-connection resources of the intermediate nodes.

The failure recovery process of VC12 service is explained hereafter with reference to accompanying drawings and a third embodiment of the present invention.

Figure 5A:
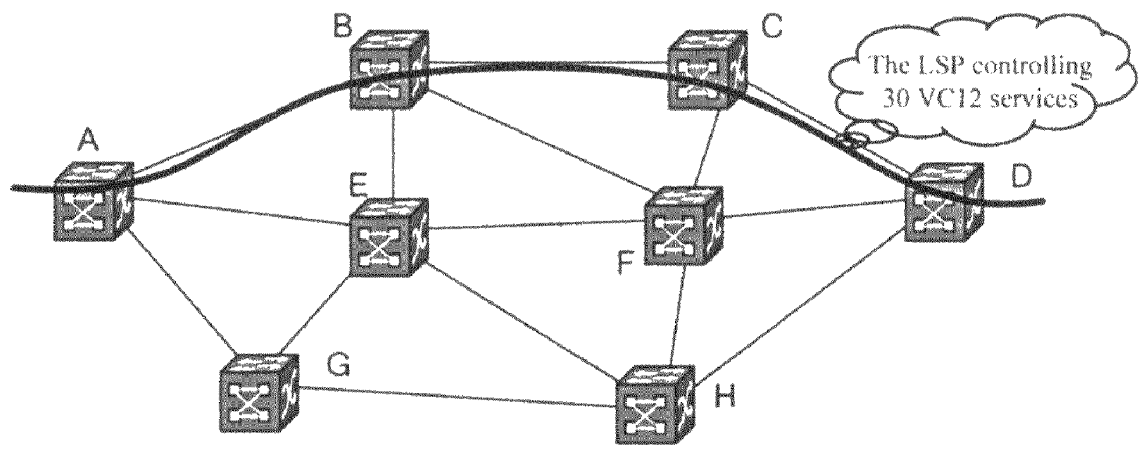
FIG. 5A is a schematic drawing illustrating the LSP before re-routing process in accordance with the third embodiment of the present invention.

FIG. 5A shows an LSP in the normal condition. As shown in FIG. 5A, an LSP controlling 30 VC12 services is established between Node A and Node D in a network. The LSP passes through Node B and Node C.

Figure 5B:
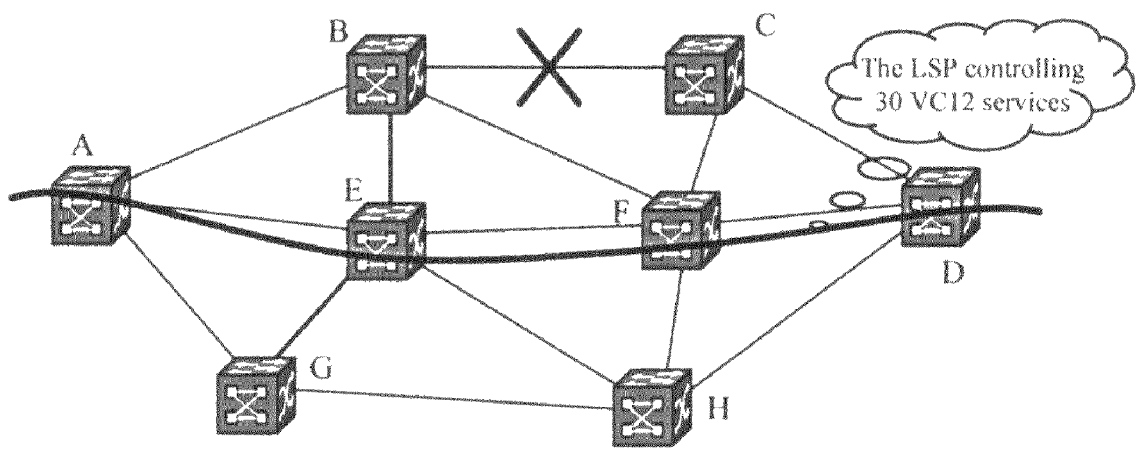
FIG. 5B is a schematic drawing illustrating the LSP after a re-routing process in accordance with the third embodiment of the present invention.

FIG. 5B is a schematic drawing illustrating the LSP after a re-routing process of VC12 services when the optical fiber breaks between Node B and Node C shown in FIG. 5A. As shown in FIG. 5B, when the optical fiber breaks between Node B and Node C, an alert message triggers the LSP re-routing process, and another LSP, between Node A and Node D, passing through Node E and Node F, is established. In the re-routing process, all the VC12 services controlled by the LSP are re-routed at the same time and transmitted along the same path, VC12 cross-connection controlled by the LSP is issued to all nodes on the path at the same time and a verification process is performed in the final process. Compared with the method in which each VC12 service needs a dedicated VC12 LSP, the method described in the foregoing description saves much more time in signaling message transmission and processing, and saves the time of calculation, verification and issuing of cross-connections, so that the re-routing performance is greatly improved.

However, in the case that the network is reloaded, if all the VC12 services controlled by an LSP are transmitted along same path and pass through the same nodes when the LSP is re-routed, the re-routing process may fail because lower order cross-connection resources in some nodes are not enough. In such cases, the node which initiates the re-routing process may determine, according to the lower order cross-connection capability information of each node, which is distributed across the whole network, whether to divide the VC12 service group into several smaller VC12 service groups and re-route the several smaller VC12 service groups separately, so as to guarantee a success re-routing process with enough resources.

It should be noted that those skilled in the art should understand that though the embodiments of the present invention deal with VC12 services, the method explained in the embodiments of establishment, such as deletion, integration and failure recovery of VC12 services is suitable for managing and transmitting other lower order VC services, such as VC11 services and VC2 services, and even is suitable for managing and transmitting VC3 services to provide higher bandwidth utilization rate and excellent re-routing performance as well.

Furthermore, in accordance with the embodiments of the present invention, the method for managing lower order VC services can also be extended, without creative labor, to other existing transmission networks in which services with varieties of granularities are transmitted. The services with varieties of granularities can be divided into coarse granularity services and fine granularity services, where the concepts of coarse granularity service and fine granularity service are relative. For example, in a Synchronous Digital Hierarchy (SDH) system, a VC3 service is a coarse granularity service compared with VC11, VC12 and VC2 services, however, a VC3 service can also be regarded as a fine granularity service compared with a VC4 service; in a wavelength optical network or Optical Transport Network (OTN), for each wavelength carrying data at a rate of 10 Gps, the VC4 service carried by the wavelength can be regarded as a fine granularity service while the service carried by the wavelength at a rate of 10 Gps can be regarded as a coarse granularity service; in a packet switched network, services shall be categorized as a coarse granularity service or a fine granularity service according to the bandwidth occupied by services over a link, i.e., a service which occupies broad bandwidth is a coarse granularity service, while a service which occupies narrow bandwidth is a fine granularity service. In the transport networks in which services with varieties of granularities are transmitted, the method in accordance with embodiment of the present invention may be adopted to manage and transmit the fine granularity services, i.e., one LSP is established for a group of fine granularity services with the same source node and destination node, transmitting all the fine granularity services through a same path; when the LSP is interrupted, all the fine granularity services controlled by the LSP shall be re-routed to another LSP or multiple LSPs to ensure the continuity of the granularity services; moreover, multiple fine granularity services can be integrated into one coarse granularity service according to the establishment condition of fine granularity services, so as to improve the resource utilization rate and re-routing performance of the transport networks.

What is claimed is:

1. A method for managing and transmitting fine granularity services, comprising:

adding a time slot of a new fine granularity service to an existing Label Switched Path (LSP) which controls a fine granularity service with the same granularity as that of the new fine granularity service to be established, upon determining that the new fine granularity service shares the same source node and destination node with the existing LSP;

establishing a cross-connection for the time slot at every node along the existing LSP; and transmitting the new fine granularity service with the new time slot and the established cross-connection, wherein the process of determining that the new fine granularity service shares the same source node and destination node with the existing LSP comprises:

reading the addresses of the source node and the destination node of the new fine granularity service from a request for establishing the new fine granularity service; and determining whether the source node and the destination node of the new service are identical with the source node and the destination node of the existing LSP according to the addresses of the source node and the destination node read from the request; and wherein the process of adding the time slot of the new fine granularity service to an existing LSP comprises:
sending an LSP bandwidth update message, which contains the time slot to be occupied by the new fine granularity service, to all nodes along the existing LSP; and
setting up, by each node along the existing LSP, a lower order cross-connection corresponding to the new fine granularity service according to the time slot contained in the LSP bandwidth update message.

2. The method of claim 1, further comprising:
before adding the time slot of the new fine granularity service to an existing LSP, determining, according to lower order cross-connection capability of each node across the whole network, whether the new fine granularity service can be established along the existing LSP;
adding the time slot of the new fine granularity service to the existing LSP if the new fine granularity service can be established; and
calculating another route and establishing a new LSP for controlling the new fine granularity service if the new fine granularity service can not be established.

3. The method of claim 1, further comprising:
calculating another route and establishing a new LSP for controlling the new fine granularity service upon determining that the source node and the destination node of the new fine granularity service to be established are not identical with the source node and the destination node of the existing LSP.

4. The method of claim 1, wherein when the fine granularity services controlled by the existing LSP contain a fine granularity service to be deleted, and wherein the method further comprises:
deleting the existing LSP if the fine granularity service to be deleted is the last fine granularity service of the existing LSP; and
sending an LSP bandwidth update message, which contains a time slot occupied by the fine granularity service to be deleted, to all the nodes along the existing LSP, and deleting, by each node on the existing LSP, a lower order cross-connection corresponding to the time slot contained in the LSP bandwidth update message, if the fine granularity service to be deleted is not the last fine granularity service of the existing LSP.

5. The method of claim 1, further comprising:
integrating the fine granularity services controlled by the existing LSP into a coarse granularity service when the number of the fine granularity services controlled by the existing LSP exceeds a preset value; and
integrating all lower order cross-connections corresponding to the existing LSP into a higher order cross-connection in all intermediate nodes except the source node and the destination node along the existing LSP.

6. The method of claim 5, wherein the process of integrating comprises:
sending a signaling message along the existing LSP to integrate fine granularity services, wherein the signaling message contains an indication for notifying the intermediate nodes on the existing LSP to establish a higher order cross-connection instead of a lower order cross-connection; and
integrating, by each intermediate node along the existing LSP, the lower order cross-connection corresponding to the fine granularity service controlled by the existing LSP into a higher order cross-connection upon the receipt of the signaling message.

7. The method of claim 1, wherein when the existing LSP is interrupted due to a node failure or a communication link failure on the existing LSP, the method further comprises:
establishing at least one new LSP through a re-routing process to control the fine granularity services controlled by the existing LSP interrupted.

8. The method of claim 7, wherein the process of establishing at least one new LSP comprises:
determining, by the node which has initiated the re-routing process, according to lower order cross-connection capability information of each node across the whole network, whether it is necessary to divide the fine granularity services to be re-routed into at least two fine granularity service groups and re-route the at least two fine granularity service groups respectively;
re-routing all fine granularity services together if it is not necessary to divide the fine granularity services to be re-routed into at least two fine granularity service groups; and
re-routing each fine granularity service group respectively if it is necessary to divide the fine granularity services to be re-routed into at least two fine granularity service groups.

9. The method of claim 8, wherein the process of re-routing comprises:
calculating a new LSP through a route algorithm, re-routing, along the new LSP all the fine granularity services controlled by the existing LSP interrupted, and issuing the lower order cross-connection to each node along the new LSP, if it is not necessary to divide the fine granularity services to be re-routed into at least two fine granularity service groups; and
calculating, through the route algorithm, at least two new LSPs each of which controls a certain number of fine granularity services, re-routing the certain number of fine granularity services controlled by each of the new LSPs, and issuing the lower order cross-connection to each node along each of the new LSPs, if it is necessary to divide the fine granularity services to be re-routed into the at least two fine granularity service groups.

10. The method of claim 1, wherein the fine granularity service is one of a Virtual Container (VC) 11 service, a VC12 service, a VC2 service and a VC3 service, and the coarse granularity service is a VC4 service.

11. An apparatus for transmitting fine granularity services, comprising:
means for adding a time slot of a new fine granularity service to an existing Label Switched Path (LSP) which controls a fine granularity service with the same granularity as that of the new fine granularity service to be established, upon determining that the new fine granularity service shares the same source node and destination node with the existing LSP; and
means for establishing a cross-connection for the time slot at every node along the existing LSP, and transmitting the new fine granularity service with the new time slot and the established cross-connection,
wherein the process of determining that the new fine granularity service shares the same source node and destination node with the existing LSP comprises: reading the addresses of the source node and the destination node of the new fine granularity service from a request for establishing the new fine granularity service; and determining whether the source node and the destination node of the new service are identical with the source node and the destination node of the existing LSP according to the addresses of the source node and the destination node read from the request; and wherein the process of adding the time slot of the new fine granularity service to an existing LSP comprises: sending an LSP bandwidth update message, which contains the time slot to be occupied by the new fine granularity service, to all nodes along the existing LSP; and setting up, by each node along the existing LSP, a lower order cross-connection corresponding to the new fine granularity service according to the time slot contained in the LSP bandwidth update message.

12. The apparatus of claim 11, further comprising:

means for integrating fine granularity services controlled by the existing LSP into a coarse granularity service; and means for integrating all lower order cross-connections corresponding to the fine granularity services into a higher order cross-connection.

13. The apparatus of claim 11, further comprising:

means for deleting the lower order cross-connection corresponding to a fine granularity service to be deleted.

14. The apparatus of claim 11, further comprising:

means for deleting the existing LSP upon determining that the fine granularity service to be deleted is the last fine granularity service of the existing LSP.

15. The apparatus of claim 13, further comprising:

means for deleting the existing LSP upon determining that the fine granularity service to be deleted is the last fine granularity service of the existing LSP.

* * * * *